J. A. HALLNER.
FRONT WHEEL MOUNTING AND STEERING ATTACHMENT.
APPLICATION FILED JULY 26, 1916.
1,234,014.
Patented July 17, 1917.
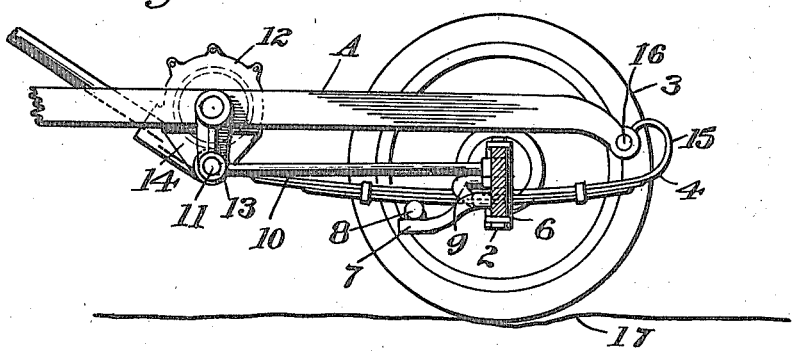
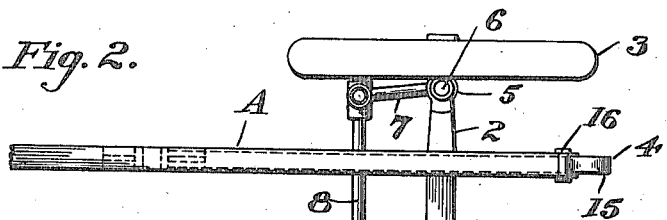
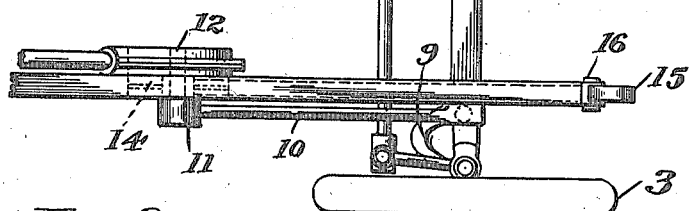
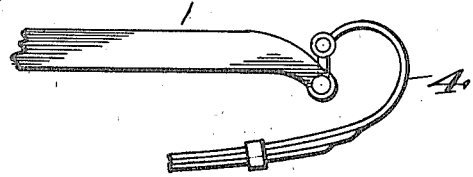
WITNESSES:
INVENTOR
John A. Hallner
BY
ATTORNEYS

UNITED STATES PATENT OFFICE.

JOHN A. HALLNER, OF TURLOCK, CALIFORNIA.

FRONT-WHEEL MOUNTING AND STEERING ATTACHMENT.

1,234,014.  Specification of Letters Patent.  Patented July 17, 1917.

Application filed July 26, 1916. Serial No. 111,399.

*To all whom it may concern:*

Be it known that I, JOHN A. HALLNER, a citizen of the United States, residing at Turlock, in the county of Stanislaus and State of California, have invented new and useful Improvements in Front - Wheel Mounting and Steering Attachments, of which the following is a specification.

This invention relates to a front wheel mounting and steering attachment, for motor driven vehicles.

The object of the present invention is to provide a simple substantial front wheel spring mounting and steering attachment for automobiles, motor trucks, and the like vehicles, which is so constructed and arranged, that the wheels will always run true to the line of travel, and that wabbling or vibration imparted to the wheel due to the generally present faulty mounting and construction, will be entirely eliminated.

Other objects will hereinafter appear.

The invention further consists of parts, and construction and combination of parts as will hereinafter be more fully described in the claims, having reference to the accompanying drawings, in which:—

Figure 1 is a side elevation partly in section, showing the front end of a motor driven vehicle.

Fig. 2 is a plan view of Fig. 1.

Fig. 3 is a modification of the fastening between the forward end of the springs and the vehicle frame.

Referring to the drawings in detail, A indicates the main frame of the vehicle, preferably of a motor driven type. 2 the front axle, 3 the wheels, and 4 the semi-elliptic springs to which the axle is secured. 5 indicates steering knuckles of suitable construction, 6 the king pins upon which they are mounted, 7 the steering arms, 8 the tie-rod connecting the same, 9 the third arm, and 10 the drag link, which in this instance is secured at its outer end by means of a ball joint to the third arm and at its inner end to a crank arm 11 which is operated by the steering mechanism generally indicated at 12, which in turn is controlled by the steering wheel not here shown.

The peculiar mounting of the semi-elliptic springs, and the position of the drag link and connected crank arm 11, forms the subject matter of the present invention. By referring to Figs. 1 and 2 it will be seen that the rear ends of the springs are pivotally attached as at 13 to a bracket 14, which is rigidly secured to the main frame A, and that the forward ends of the springs terminate in a scroll 15, which is pivotally secured to the forward end of the frame as at 16.

It may furthermore be seen that the rear half of each spring extending from the axle to the pivoted point 13 is practically speaking straight, in this manner permitting the said spring sections to act as radius rods between the axle and the pivots 13, in this manner causing the axle to maintain a fixed distance with relation to the bracket 14, when the frame moves with relation to the axle. Again by referring to Fig. 1 it will be seen that the crank arm 11 is positioned in direct alinement with the bracket 14 and the pivotal point 13, and that the outer end of the third arm 9 carrying the ball joint is positioned in alinement with a center line drawn through the axle. This permits the insertion of a drag link the length of which is equal to the distance between the center line of the axle and the center of the bracket 14, or the pivotal point 13.

In operation with the vehicle traveling in a forward direction, it will be seen that if a chuck hole or other obstruction is encountered such as indicated at 17 when traveling over a road surface, that the axle will either move to or away from the frame A, or conversely that the frame will move to or away from the axle, that is, the yielding springs permit a comparatively free movement between the axle and the frame when obstructions are encountered, or pressure otherwise applied. The yielding of the springs so far as ordinary motor driven vehicles are concerned, causes the springs to straighten out and consequently transmit a movement to the axle which causes the same to move either ahead or back with relation to the frame proper. This is particularly true where a shackle is employed as a connection between the rear ends of the semi-elliptic springs and the frame. Furthermore it will be found that the position of the crank arm 11 and the length of the drag link 10, is as a rule much greater than the length of the spring from the axle to the rear of the shackle connection. This causes a variable movement between the axle and the third arm each time the springs yield or flex, and this movement is in turn transmitted through the third arm and the connected steering arms to the wheels proper, causing this to vibrate or wabble. This defect has been entirely overcome by the spring mounting here shown, by placing the crank arm 11 at the point shown, which permits the employment of a drag link having the length equal to the length of the rear half of the springs. A uniform movement is in this manner obtained between the drag link and the rear half of the springs, that is, both will swing in a comparatively equal radial arc either about the pivotal point 13, or the axle proper. The unequal movement between the two parts is thus not only reduced, but entirely eliminated, in this manner preventing wabbling or vibration of the front wheels. The wheels are furthermore permitted to follow the true line of travel at all times, whether the road bed is smooth or rough. The strain on the steering mechanism is almost entirely removed, and the tire wear considerably decreased.

The materials and finish of the several parts employed in the structure here shown may otherwise be such as the judgment and experience of the manufacturer may indicate.

I wish it understood that various changes in form, proportions, and minor details of construction may be resorted to within the scope of the appended claims and that I do not wish to limit myself to the specific design or construction here shown.

Having thus described my invention, what I claim and desire to secure by letters Patent is:—

1. The combination with the front axle and the frame of a motor driven vehicle, of a pair of springs interposed between the axle and frame, said springs having their rear ends pivotally secured to the frame, and a yielding connection between the forward ends of the springs and the frame to permit the lengthening of the springs when pressure is exerted, a steering knuckle and a wheel on each end of the axle, a steering arm on each knuckle, a tie rod connecting said arms, a third arm on one of the knuckles, and a drag link connected with the third arm, said drag link having a length equal to the distance between the axle center and the rear pivotal connections of the springs.

2. The combination with the spring supported front axle on a vehicle, the steering knuckles and the third arm by which they are operated, of a stationary connection between the rear ends of the springs and the frame, a yielding connection between the forward ends of the springs and the frame, and a drag link connected with the third arm, said drag link having a length substantially equal to the distance between the axle and rear stationary connection between the springs and frame, and having a radial swing substantially parallel with the axle.

3. The combination with the main frame of a vehicle, the front axle, the steering knuckles and the third arm by which they are operated, of a pair of semi-elliptical springs interposed between the axle and the frame, said springs having their rear ends pivotally connected to the frame and their forward ends yieldingly connected to the frame, a crank arm on the frame adapted to be operated by the steering wheel on the vehicle, said crank arm having its free end in alinement with the rear pivotally connected ends of the springs, and a drag link connected at one end with said crank arm and at the opposite end to the third arm.

4. The combination with the main frame of a vehicle, the front axle, the steering knuckles and the third arm by which they are operated, of a pair of semi-elliptical springs interposed between the axle and the frame, said springs having their rear ends pivotally connected to the frame and their forward ends yieldingly connected to the frame, and a drag link connected with the third arm having a radial swing substantially equal to the swing of the axle and a length equal to the distance from the center of the axle to the center of the pivotal connection formed between the rear ends of the springs and the frame.

In testimony whereof I have hereunto set my hand in the presence of two subscribing witnesses.

JOHN A. HALLNER.

Witnesses:
 HOWARD WHIPPLE,
 IRMA S. HORNE.